United States Patent [19]

Alder et al.

[11] 4,064,063

[45] Dec. 20, 1977

[54] PROCESS FOR THE MANUFACTURE OF SPRAY DRIED DETERGENTS CONTAINING NONIONIC TENSIDES

[75] Inventors: Wilfried Alder, Hilden; Josef Huppertz, Dusseldorf-Holthausen; Herbert Latka, Neuss; Gerhard Sperling, Hilden, all of Germany

[73] Assignee: Henkel Kommanditgesellschaft auf Aktien, Dusseldorf, Germany

[21] Appl. No.: 590,191

[22] Filed: June 25, 1975

[30] Foreign Application Priority Data

July 1, 1974 Germany ............................ 2431529

[51] Int. Cl.$^2$ ........................ B01J 2/04; C11D 11/00; C11D 11/02; C11D 17/06

[52] U.S. Cl. ................................ 252/135; 23/313 R; 23/313 AS; 159/4 R; 159/4 J; 252/89 R; 252/140; 252/174; 252/259.5; 252/384; 252/385; 252/DIG. 1; 427/212; 427/215

[58] Field of Search .................. 252/89, 99, 135, 134, 252/174, DIG. 1; 159/4 R, 4 J; 23/313; 427/212; 1/215

[56] References Cited

U.S. PATENT DOCUMENTS

| | | | |
|---|---|---|---|
| 2,308,992 | 1/1943 | Mertens | 252/97 |
| 3,562,164 | 2/1971 | Bittner | 252/95 |
| 3,783,008 | 1/1974 | Weldes | 252/135 X |
| 3,819,526 | 6/1974 | Pierce | 252/135 |
| 3,915,878 | 10/1975 | Yurko | 252/89 |
| 3,920,586 | 11/1975 | Bonaparte | 252/531 |

*Primary Examiner*—Dennis L. Albrecht
*Attorney, Agent, or Firm*—Hammond & Littell

[57] ABSTRACT

An improvement in the process for the production of spray dried detergents containing nonionic tensides where the aqueous detergent slurry containing from 50% to 90% by weight of the total solids of the final spray dried detergent and from 0 to 5% at the most by weight of the total solids of nonionic tensides is sprayed into a conventional spray drier and simultaneously at the area of the spray cone a watersoluble powder is injected consisting of the remainder of the total solids of the final spray dried detergent having at least one nonionic tenside deposited thereon as a granulate where the ratio by weight of solids to nonionic tenside amounts to 50:1 to 5:1; whereby larger amounts of nonionic tensides can be incorporated into the final spray dried detergent without increased heating costs.

5 Claims, No Drawings

PROCESS FOR THE MANUFACTURE OF SPRAY DRIED DETERGENTS CONTAINING NONIONIC TENSIDES

THE PRIOR ART

As is known, readily soluble detergents having a low bulk weight are manufactured by means of spray drying. In this process an aqueous, but still pumpable detergent slurry containing all of the ingredients of the spray dried detergent, is sprayed under high pressure into a fall space by means of rotating spray elements or, better, by means of nozzles, where, in the fall space, hot air is passed therethrough in either a concurrent or countercurrent direction. In this conventional method, the amount of heat of evaporation required depends upon the water content of the detergent slurry to be spray dried. Therefor an attempt must be made to keep this water content as low as possible in the interest of low energy consumption. On the other hand, the viscosity of the detergent slurry considerably increases with decreasing water content and finally reaches values at which the slurry cannot be pumped anymore.

The solid and liquid components contained in the detergent slurry have been found to contribute to a different degree to this increase of the viscosity. It was surprisingly found that the contribution of nonionic surface-active compounds or tensides belonging to the class of polyoxyethylene glycols to this viscosity increase is especially large provided that their share of the dissolved or dispersed compounds in the detergent slurry lies above 4% to 6% on the dry basis. If, in the interest of high detergency power, especially in the range about 60° C, one does not want to forego the presence of nonionic tensides,but if, on the other hand, an increase in the viscosity is to be avoided, it has previously been necessary to admix at least a part of the nonionic tensides to the powder after spray drying.

Such mixing methods have been repeatedly suggested although for other reasons. The post spraying or granulating of the liquid nonionic tensides or those liquefied either by heating or the addition of water onto the powdery ingredients has among various advantages, that of binding the dust and making fine particles coarser. On the other hand, such a mixing process requires extensive and costly mixing equipment. Moreover, the spray dried powders have a hollow-spherical form and are very sensitive to mechanical processing, especially shortly after their manufacture, and can easily crumble during a mixing process. This is disadvantageous for both the powder structure and the dissolving capacity of the powder. Therefore, in the case of such granulating processes, as for example, described in British Pat. No. 1,093,607, the starting materials are pulverulent premixes of the individual components and these are granulated while adding water and nonionic surfactants thereto. Usually, such granulates have a much more compacted grain than the hollow-sphere powders, and, when added to water, immediately sink to the bottom by contrast to said powders. Therefore these granulates do not have the advantageous dissolving qualities of the hollow-sphere powders. Furthermore, since water added to such granulates does not evaporate, but remains bound thereto as water of crystallization, they frequently have the tendency of undergoing a post-crystallization when stored for a prolonged time. Thereby, lump-like aggregates are formed which have to be removed by sieving or have to be ground, thus requiring additional expense.

It has been also proposed to use one single processing step for the spraying together of a liquid tenside containing batch and a pulverulent premix which essentially contains the detergent builders. Thereby, as described, for instance, in British Pat. No. 1,118,908, a salt mixture which contains anhydrous sodium tripolyphosphate as main ingredient is blown into a fall space and at the same time, an aqueous tenside containing concentrate and additional nonionic tensides are sprayed in through numerous spraying nozzles. In this process, the water present is also not removed by evaporation, but bound in the detergent granulate by the formation of hydrates. Likewise, readily dissolvable hollow-spherical powders are not formed, and the danger exists of the formation of lumps by post-crystallization.

OBJECTS OF THE INVENTION

An object of the present invention is the development of a process which enables the production of spray dried detergents having a content of nonionic tensides and having a large amount thereof in a hollow-spherical powdery form without requiring increased production costs.

Another object of the invention is the development, in the process for the production of spray dried detergent powders containing at least one nonionic surface-active compound of the class of polyoxyalkylene glycol derivatives comprising the steps of spraying an aqueous slurry of the detergent ingredients in a conical pattern into a fall space while passing a large volume of air therethrough at an inlet temperature in excess of 150° C and recovering said spray dried detergent powders containing at least one nonionic surface-active compound of the class of polyoxyalkylene glycol derivatives, the improvement consisting of utilizing, as said aqueous slurry, an aqueous slurry containing from 50% to 90% by weight of the total solids of the final spray dried detergent, including from 0 to 5% at the most, by weight of the total solids, of said at least one nonionic surface-active compound and injecting into said fall space above said conical spray pattern a water-soluble powder granulate consisting of the remainder of the total solids of the final spray dried detergent having an amount of said at least one nonionic surface-active compound of the class of polyoxyalkylene glycol derivatives deposited thereon in such a manner as to form a granulate, where the ratio by weight of solids other than said nonionic surface-active compound to said nonionic surface-active compound in said granulate amounts of 50:1 to 5:1.

A further object of the present invention is the obtaining of an improved spray dried detergent powder by the above process.

These and other objects of the present invention will become more apparent as the description thereof proceeds.

DESCRIPTION OF THE INVENTION

The above objects have been achieved and the drawbacks of the prior art have been avoided by the practice of the present invention comprising a process for the manufacture of spray dried detergents containing nonionic surface-active compounds belonging to the class of polyoxyalkylene glycol derivatives whereby spray drying installations known per se are employed which are equipped with nozzles for the spraying of an aqueous detergent slurry therein and at least one inlet for the blowing-in of pulverulent detergent components, which installations are to be operated at an air temperature above 150° C, said process being characterized in that an aqueous detergent slurry containing 50% to 90% by weight of all solid components to be processed and with a share of 0 to at the most 5% by weight of nonionic surface-active compounds, is employed as a starting slurry, that this detergent slurry is sprayed in a manner known per se, and that into the area of the spraying cone, a water-soluble powder is injected by blowing consisting of the remainder of the solids and at least one nonionic surface-active compound deposited thereupon in such a manner as to form a granulate, whereby the ratio by weight of solids other than nonionic surface-active compounds to nonionic surface-active compounds amounts to 50:1 to 5:1.

More particularly the invention resides, in the process for the production of spray dried detergent powders containing at least one nonionic surface-active compound of the class of polyoxyalkylene glycol derivatives comprising the steps of spraying an aqueous slurry of the detergent ingredients in a conical pattern into a fall space while passing a large volume of air therethrough at an inlet temperature in excess of 150° C and recovering said spray dried detergent powders containing at least one nonionic surface-active compound of the class of polyoxyalkylene glycol derivatives, the improvement consisting of utilizing, as said aqueous slurry, an aqueous slurry containing from 50% to 90% by weight of the total solids of the final spray dried detergent including from 0 to 5% at the most, by weight of the total solids, of said at least one nonionic surface-active compound and injecting into said fall space above said conical spray pattern a water-soluble powder granulate consisting of the remainder of the total solids of the final spray dried detergent having an amount of said at least one nonionic surface-active compound of the class of polyoyalkylene glycol derivatives deposited thereon in such a manner as to form a granulate, where the ratio by weight of solids other than said nonionic surface-active compound to said nonionic surface-active compound in said granulate amounts of 50:1 to 5:1; as well as the spray dried detergent powders produced by process.

Of all the solids to be processed, 70% to 85% are preferably introduced into the drying installation via the aqueous detergent slurry and 15% to 30% including the nonionic tensides are preferably introduced via the water-soluble powder which has to be injected in solid form by blowing.

The solid content of the prior art detergent slurry which, depending upon the composition of the constituents, amounts to 50% maximally 65% by weight, can be increased to 65% to 75% by weight when the procedure of the invention is employed and the detergent slurry in the absence of nonionic tensides is sprayed into the drier. Solids which can be contained in the detergent slurry are, for example, anionic and/or zwitterionic surface-active compounds, builder salts, soil suspending agents, and optical brighteners.

Suitable anionic surface-active compounds or tensides are those of the sulfonate or sulfate types, especially alkyl-benzenesulfonates, olefinsulfonates, alkylsulfonates and $\alpha$-sulfofatty acid esters, primary alkyl sulfates as well as the sulfates of ethoxylated higher molecular weight alcohols having 2 to 3 ether groups in the molecule. Additional useful compounds are the alkali metal soaps of fatty acids of natural or synthetic origin, for example, the alkali metal soaps of coconut fatty acids, pam-kernel oil fatty acids, and tallow fatty acids, and, in case an antifoam effect is desired, also the alkali metal soaps of hydrogenated rapeseed oil fatty acids or fish oil fatty acids. The zwitterionic surface-active compounds or tensides customarily employed, are the alkylbetaines, especially alkylsulfobetaines. Anionic tensides should preferably be present in the form of their sodium salts. When the above-named anionic and zwitterionic compounds possess an aliphatic hydrocarbon residue, the latter should be preferably straight-chain and contain 8 to 22, preferably 12 to 18 carbon atoms. In the compounds having an araliphatic hydrocarbon residue, the preferably unbranched alkyl chains contain 6 to 16, especially 10 to 14 carbon atoms.

Suitable builder salts are the polymeric phosphates the carbonates, and the silicates of the alkali metals such as potassium and, especially, sodium. The sodium silicate compounds are preferred whereby they have a ratio of $SiO_2$ to $Na_2O$ from 1:1 to 3.5:1. An especially suitable polymeric phosphate is pentasodium tripolyphosphate which can be present mixed with its hydrolysis products, the mono- and diphosphates, as well as with higher-condensed phosphates, for instance, the tetrapolyphosphates. The polymeric phosphates can be partially or totally replaced with organic aminopolycarboxylic acids having a complexing effect. This group especially includes the alkali metal salts of nitrilotriacetic acid and ethylenediaminetetraacetic acid. Suitable are also the alkali metal salts of diethylenetriaminepentaacetic acid as well as the higher homologs of the above-named aminopolycarboxylic acids. These homologs can be manufactured, for example, by the polymerization of an ester, an amide, or a nitrile of aziridine-N-acetic acid followed by saponification to obtain the carboxylic acid salts, or by the reaction in an alkaline medium of polyethyleneimine with chloroacetic acid salts or bromoacetic acid salts. Other suitable aminopolycarboxylic acids are poly-(N-succinic acid)-ethyleneimine and poly-(N-tricarballylic acid)-ethyleneimine and poly-(N-butane-2,3,4-tricarboxylic acid)-ethyleneimine, which are obtainable analogously to the N-acetic acid derivatives.

Furthermore, polyphosphonic acids having a complexing effect can be employed as builder salts, for example, the alkali metal salts of aminopolyphosphonic acids, especially those of aminotri-(methylenediphosphonic acid). 1-hydroxyethane-1,1-diphosphonic acid, methylenediphosphonic acid, ethylenediphosphonic acid, as well as the alkali metal salts of the higher homologs of the above-named polyphosphonic acids. Mixtures of the above-named complexing agents can be likewise used.

Other builder salts which can be present in the detergent slurry are polycarboxylic acids and polymers containing carboxyl groups both of which are free from nitrogen and phosphorus atoms. Suitable are citric acid, tartaric acid, benzenehexacarboxylic acid, and tetrafuranetetracarboxylic acid. Also usable are polycarboxylic acids containing carboxymethyl ether groups, such as 2,2'-oxydisuccinic acid, as well as polyhydric alcohols or hydroxycarboxylic acids which are partially or completely etherified with glycolic acid, for example, tris-(carboxymethyl)-glycerol, bis-(carboxymethyl)-glyceric acid, and carboxymethylated or oxidized polysaccharides. Furthermore, polymeric carboxylic acids having a molecular weight of at least 350 are also suitable in the form of their water-soluble alkali metal salts such as sodium or potassium salts, such as poly-acrylic acid, polymethacrylic acid, poly-α-hydroxyacrylic acid, polymaleic acid, polyitaconic acid, polymesaconic acid, polybutenetricarboxylic acid, as well as the copolymerisates of the corresponding monomeric acids with each other or with ethylenically unsaturated compounds, such as ethylene, propylene, isobutylene, vinyl methyl ether, or furan.

Suitable soil suspending agents or graying inhibitors are especially carboxymethyl cellulose, methyl cellulose, and, in addition, water-soluble polyesters and polyamides of polybasic carboxylic acids and polyhydric glycols, or diamines possessing carboxyl groups, betaine groups, or sulfobetaine groups which are capable of forming salts. Also suitable are polymers or copolymers of vinyl alcohol, vinylpyrrolidinone, acrylamide, and acrylonitrile, which are colloidally soluble in water.

Suitable optical brighteners are the alkali metal salts of 4,4'-bis-(2"-anilino-4"-morpholino-1,3,5-triazin-6"-amino) -2,2'-stilbenedisulfonic acid or similarly constructed compounds which instead of the morpholino group contain a diethanolamino, a methylamino, or a β-methoxyethylamino group. In addition, optical brightners for polyamide fibers are useable such as of the diarylpyrazoline type, for example, 1-(p-sulfonamidophenyl)-3-(p-chlorophenyl)-$\Delta^2$-pyrazoline as well as similarly structured compounds which instead of the sulfonamido group possess a carboxymethyl or an acetylamino group. Also usable are substituted aminocoumarins, for example, 4-methyl-7-dimethylamino-coumarin or 4-methyl-7-diethylaminocoumarin. Other compounds suitable as polyamide fiber optical brighteners are 1-(2-benzimidazolyl)-2-hydroxyethyl-2-benzimidazolyl)-ethylene and 1-ethyl-3-phenyl-7-diethylaminocarbostyril. Suitable compounds for the optical brightening of polyester and polyamide fibers are compounds such as 2,5-bis(2-benzoxazolyl)-thiophene, 2-(2-benzoxazolyl)-naphtho-[2,3-b]-thiophene, and 1,2-di-(5-methyl-2-benzoxazolyl)-ethylene. Optical brighteners of the substituted diphenylcarbastyril type can also be present. It is also possible to use mixtures of the above-named optical brighteners.

Further components which can be incorporated in the detergent slurry are neutral salts, especially sodium sulfate, as well as magnesium silicate which acts as stabilizer for per-compounds. Furthermore, hydrotropic substances, such as alkali metal salts of toluenesulfonic acid, cumenesulfonic acid or xylenesulfonic acid may be emloyed.

The water-soluble component blown into the drying installation in form of a powder can contain the same tensides and builder salts as have been enumerated above. However, for the manufacture of this component, it is preferred to start with pentasodium tripolyphosphate as well as with its mixtures with alkali metal silicates. The noniunic surfactants are sprayed in liquid form or are caused to deposited with the formation of a granulate on the polyphosphate or its premixes, whereby the conventional mixing and granulating devices can be used. The amount of the nonionic tenside to be deposited should be so chosen that the powder or granulate obtained is still free-flowing, which generally is secured with a weight ratio of 20:1 to 8:1, although larger ratios up to 50:1 can be employed. When larger amounts of nonionic tensides are to be used, giving ratios down to 5:1, it is recommended to add substances having large absorptive surface areas, for example, silicic acid or aluminum silicates, such as natural or synthetic zeolites.

The ratio by weight of solids other than nonionic tensides to deposited nonionic tensides preferably amounts to 20:1 to 10:1.

Suitable nonionic surface-active compounds or tensides are those of the class of polyoxyalkylene glycol derivatives, especially the ethoxylation products adducted to primary or secondary alkanols or alkenols, vicinal alkanediols, and alkylphenols, which contain 10 to 20 carbon atoms in the aliphatic hydrocarbon chain and 5 to 20, especially 8 to 15 ethylene glycol ether groups. Also usable are mixtures of the above-named ethoxylation products having different degrees of ethoxylation, for example, ethoxylated primary $C_{14}$ to $C_{18}$ alcohols, such as tallow, coconut, or oleyl alcohols having on the average 12 to 16 ethylene glycol ether groups.

Other suitable nonionic tensides are those which are derived from the above-named compounds and contain propylene glycol ether groups in addition to ethylene glycol ether groups, for example, alcohols having 10 to 30 ethylene glycol ether groups and 3 to 30 propylene glycol ether groups. Also suitable are the ethoxylation products of mercaptans, such as alkanethiols, higher fatty acid amides, and higher fatty acids. Usable are also the water-soluble products of the addition of ethylene oxide to polyoxypropylene glycol, ethylenediamine adducted with propylene oxide, and alkylenepolyoxypropylene glycol having 1 to 10 carbon atoms in the alkylene chain, which adducts contain 20 to 250 ethylene glycol ether groups and 10 to 100 propylene glycol ether groups. The above-named compounds usually contain 1 to 5 ethylene glycol ether units per propylene glycol ether unit.

For the joint spraying of the aqueous detergent slurry and the powder component mixed with the nonionic surfactant, conventional spraying towers ae preferably employed which are fed with hot air passed in the same direction or led countercurrently. The detergent slurry is sprayed at the upper end of the tower via several nozzles which are disposed radially in an angle obliquely deflected downwards to form a spray cone. By means of flowing air, the soluble powder is introduced from above via pipe disposed centrally in the tower roof. The lower rim of the pipe ends above the spraying cone of the radially disposed nozzles so that sprayed material cannot stick to the pipe. Preferably, the diameter of the downpipe is somewhat narrowed at the outlet in order that in this area, an increased flow rate, hence, better vorticity and mixing of the solid and liquid spray materials can be accomplished.

The spray dried powder thus obtained has a homogeneous composition. The weight per liter lies between 300 and 800 gm and increases with the amount of the material blown-in as a powder. The grain spectrum is uniform to a large degree and dusty particles are not present to a disturbing extent. The grains largely show the hollow-sphere structure and correspondingly, are easily and rapidly soluble in cold water. The savings on evaporation energy in the process according to the invention amounts to 20% to 30% as compared to a conventional spray drying process.

The following specific embodiments illustrate the practice of the invention without being limitative in any respect.

EXAMPLES

Employing a mixer equipped with rotating plowsharelike paddles, an ethoxylated fatty alcohol ($C_{16}$ to $C_{18}$ fatty alcohol, iodine number = 50, average ethoxylation degree = 10) which was melted and heated to 60° C was deposited either on a pulverulent pentasodium tripolyphosphate (weight/liter 800 gm; average grain size, 0.1 mm) or on a mixture of the above pentasodium tripolyphosphate and finely-divided silicic acid (Aerosil). The pulverulent granulates thus prepared had the following composition as given in Table I.

TABLE I

| Composition (weight percent) | Example A | Example B |
|---|---|---|
| Ethoxylate | 8 | 12 |
| Tripolyphosphate | 92 | 85 |
| Silicic Acid | — | 3 |
| Sieve Analysis (weight percent) | | |
| 0.8 mm | 0.4 | 1.1 |
| 0.4 mm | 4.0 | 10.5 |
| 0.2 mm | 32.4 | 73.8 |
| 0.1 mm | 56.2 | 14.2 |
| >0.1 mm | 7.0 | 0.4 |

Both granulates were satisfactorily free-flowing and have a particle size predominately in the range of from 0.1 to 0.8 mm. The following compositions were used for the preparation of the water-containing detergent slurry whereby the components were added to the water of the batch in the sequence given below in Table II (and whereby the components were calculated as anhydrous substances and "EO" means adducted ethylene oxide):

TABLE II

| Component parts by weight | Examples C | D | E |
|---|---|---|---|
| NaOH | 0.5 | 0.5 | 0.5 |
| Fatty Acid $C_{12}$ to $C_{22}$ | 4.1 | 4.1 | 4.1 |
| Na n-Dodecylbenzene-sulfonate | 8.2 | 8.2 | 8.2 |
| Water Glass ($Na_2O$:$SiO_2$ = 1:3.3) | 4.1 | 4.1 | 4.1 |
| Na Ethylenediaminetetraacetate | 0.27 | 0.27 | 0.27 |
| Na Carboxylmethyl-Cellulose | 1.9 | 1.9 | 1.9 |
| Mg Silicate | 2.7 | 2.7 | 2.7 |
| Optical Brightener | 0.33 | 0.33 | 0.33 |
| Na Tripolyphosphate | 34.6 | 34.6 | 34.6 |
| Sodium Sulfate | 7.8 | 7.8 | 7.8 |
| Tallow Alcohol + 5 EO | — | 1.8 | 1.8 |
| Tallow Alcohol + 14 EO | — | 3.7 | 3.7 |
| Fatty Alcohol $C_{16}$ to $C_{18}$ + 10 EO (Iodine Number = 50) | — | — | 1.7 |

So much water was added that the resulting slurry could be still pumped and sprayed, which corresponded to a water content of 28% by weight in the case of mixture C, to a water content of 32% by weight in the case of mixture D, and a water content of 38% in the case of the mixture E (a comparison product).

Under a pressure of 40 atm., the detergent slurry which had been heated to 82° C was fed into a spraying tower equipped with two nozzles (of 3.5 mm diameter). The pulverulent tripolyphosphate or tripolyphosphate on which nonionic surfactants had been deposited was blown-in by means of an air stream via a down tube which ended above the nozzle area. The quantities used are listed in Table III. The dry air which had been heated to 245° C was led therethrough countercurrently. The temperature of the outgoing air was 84° C. The ratio between the material to be sprayed and dry air fed was each time so regulated that the obtained powder had a moisture content of 10% by weight. The properties of the powder are likewise listed in Table III. The solubility was tested in water of 30° C. Two comparison tests are listed, in the first of which all solids were sprayed in form of a liquid slurry whereas in the second test, the aqueous batch containing all nonionic surfactants was used together with non-treated tripolyphosphate (TPP).

TABLE III

| | Solids (Based on the End Product) In Blown-In Powder | In the Aqueous Slurry | Conc. of the Aqueous Slurry | Water to be Evaporated (Based on the End Product | Properties of the spray dried Powder |
|---|---|---|---|---|---|
| Comparison I | — | 80% E<br>20% TPP | 60% | 30% | soft grain, barely dusty, flowability and solubility are good |
| Comparison II | 20% TPP | 80% E | 62% | 20.4% | as in Comparison I |
| Example I | 21.8% A | 78.2% D | 67% | 15.8% | hard grain, dust-free, flowability and solubility are very good |
| Example II | 22.7% B | 77.3% C | 72% | 11.6% | as in Example I |

The comparison product II and the product prepared according to Example I had the following screen sizes given in Table IV.

TABLE IV

| | 1.6 | 0.8 | 0.4 | 0.2 | 0.1 | 0.1 mm |
|---|---|---|---|---|---|---|
| Comparison II | 3.0 | 38.6 | 46.4 | 9.6 | 2.4 | 0 wt.-% |
| Example I | 1.6 | 36.7 | 37.7 | 17.2 | 6.8 | 0 wt.-% |

Thus, detrimental changes in the grain spectrum did not occur.

The final amount of nonionic tenside in each of the powders was substantially the same.

The results show that use of the process according to the invention not only results in a saving of energy, but also in the preparation of a product showing improvements as to the properties of the powder and its solubility.

The preceding specific emodiments are illustrative of the practice of the invention. It is to be understood however that other expedients known to those skilled in the art or disclosed herein may be employed without departing from the spirit of the invention or the scope of the appended claims.

We claim:

1. In the process of the production of spray dried detergent powders containing at least one nonionic surfaceactive compound of the class of polyoxyalkylene glycol derivatives comprising the steps of spraying an aqueous slurry of the detergent ingredients in a conical pattern into a fall space while passing a large volume of air therethrough at an inlet temperature in excess of 150° and recovering said spray dried detergent powders containing at least one nonionic surface-active compound of the class of an ethoxylation product of an alcohol selected from the group consisting of alkanols having 10 to 20 carbon atoms, alkenols having 10 to 20 carbon atoms, vicinal alkanediols having 10 to 20 carbon atoms and alkylphenols having 10 to 20 carbon atoms in the alkyl, said ethoxylation product containing from 5 to 20 oxyethylene units, and conventional detergent components of the following type: anionic surface-active compounds, zwitterionic surface-active compounds, builder salts, soil suspending agents, optical brighteners, neutral salts, magnesium silicate and hydrotropic substances, the improvement consisting of utilizing, as said aqueous slurry, an aqueous slurry containing from 50% to 90% by weight of the total solids of the final spray dried detergent including from 0 to 5% at most, by weight of the total solids, of said at least one nonionic surface-active compounds, said aqueous slurry having a solids content of from 65% to 75% by weight, and injecting into said fall space above said conical spray pattern a free-flowing, water-soluble powder granulate consisting of the remainder of the total solids of the final spray dried detergent selected from the group consisting of alkali metal polymeric phosphates and mixtures of alkali metal polymeric phosphate and alkali metal silicates having an amount of said at least one nonionic surface-active compound of the class of polyoxyalkylene glycol derivatives deposited thereon in such a manner as to form a granulate, having a particle size predominately in the range of from 0.1 to 0.8 mm, where the ratio by weight of solids other than said nonionic surface-active compound to said nonionic surface-active compound in said granulate amounts to 20:1 to 8:1.

2. The process of claim 1 wherein said aqueous slurry contains from 70% to 85% by weight of the total solids of the final spray dried detergent and said water-soluble powder granulate contains from 15% to 30% by weight of the total solids of the final spray dried detergent.

3. The process of claim 1 wherein said aqueous slurry contains from 65% to 70% by weight of the total solids of the final spray dried detergent and said water-soluble powder granulate contains from 30% to 35% by weight of the total solids of the final spray dried detergent.

4. The process of claim 1 wherein said ethoxylation product contains from 8 to 15 oxyethylene units.

5. In the process for the production of spray dried detergent powders containing at least one nonionic surface-active compound of the class of polyoxyalkylene glycol derivatives comprising the steps of spraying an aqueous slurry of the detergent ingredients in a conical pattern into a fall space while passing a large volume of air therethrough at an inlet temperature in excess of 150° C and recovering said spray dried detergent powders containing at least one nonionic surface-active compound of the class of polyoxyalkylene glycol derivatives and conventional detergent components of the following type: anionic surface-active compounds, zwitterionic surface-active compounds, builder slats, soil suspending agents, optical brighteners, neutral salts, magnesium silicate and hydrotropic substances, the improvement consisting of utilizing, as said aqueous slurry, an aqueous slurry containing from 50% to 90% by weight of the total solids of the final spray dried detergent including from 0 to 5% at the most, by weight of the total solids, of said at least one nonionic surfaceactive compound, said aqueous slurry having a solids content of from 65% to 75% by weight, and injecting into said fall space above said conical spray pattern a free-flowing, water-soluble powder granulate consisting of the remainder of the total solids of the final spray dried detergent selected from the group consisting of alkali metal polymeric phosphates and mixtures of alkali metalpolymeric phosphate and alkali metal silicates having an amount of said at least one nonionic surface-active compound of the class of polyoxyalkylene glycol derivatives deposited thereon in such a manner as to form a granulate, having a particle size predominately in the range of from 0.1 to 0.8 mm, where said water-soluble powder granulate has a ratio by weight of solids other than said nonionic surface-active compound to said nonionic surface-active compound of from 8:1 to 5:1 and contains additional adsorption agents having a large area selected from the group consisting of silicic acid, natural zeolites and synthetic zeolites in sufficient amounts so that the granulate is free-flowing.

* * * * *